Figure 1:
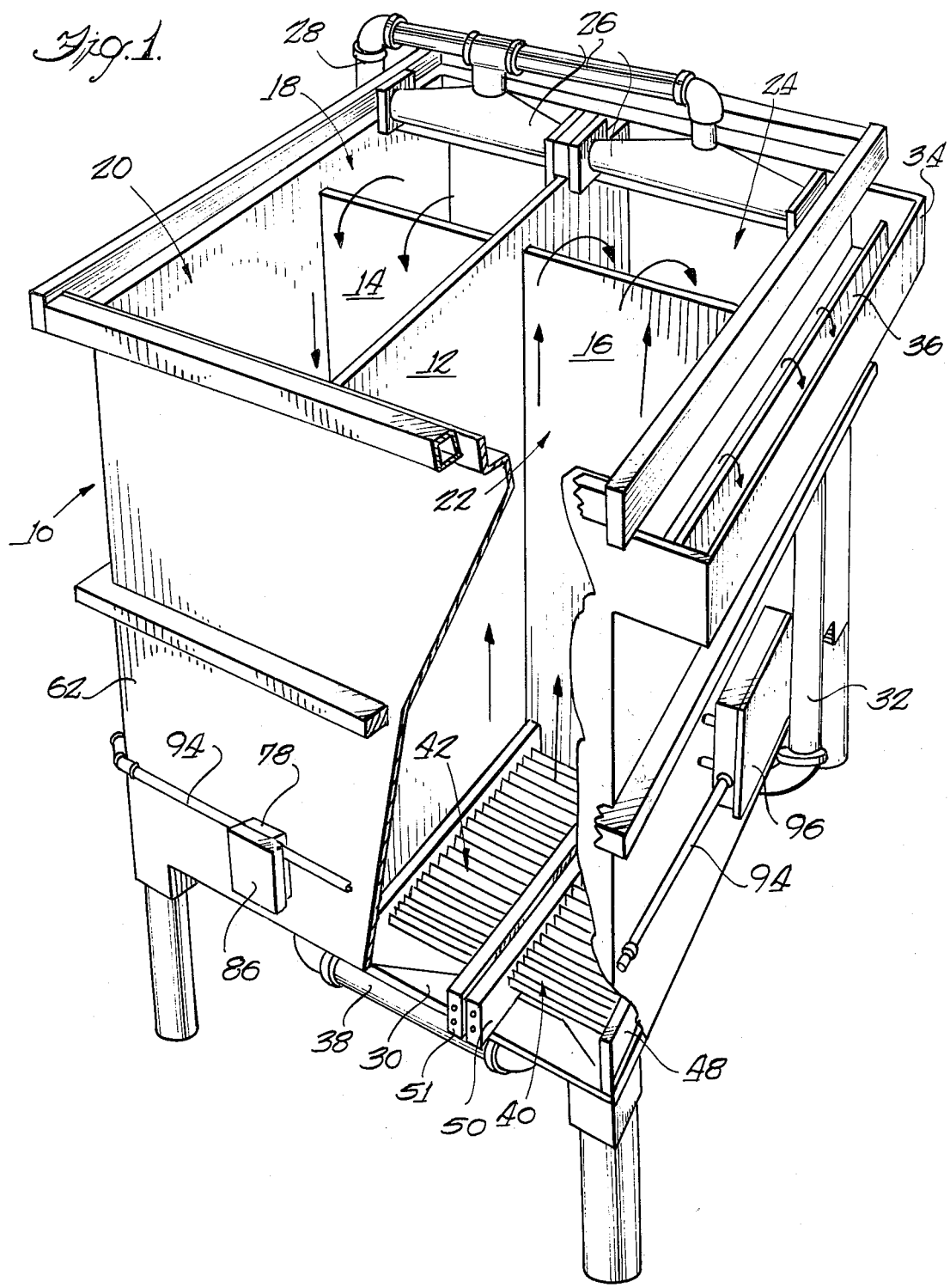

United States Patent [19]
Russell et al.

[11] 3,898,150
[45] Aug. 5, 1975

[54] ELECTROFLOTATION APPARATUS

[75] Inventors: Charles E. Russell, Wayne; Fred E. Russell, Elgin, both of Ill.

[73] Assignee: Waste Water Systems, Inc., Hoffman Estates, Ill.

[22] Filed: Aug. 15, 1974

[21] Appl. No.: 497,739

[52] U.S. Cl. .............. 204/275; 204/149; 204/278; 204/286; 204/290 R; 204/297 R
[51] Int. Cl. ..................... C02b 1/82; B01k 3/04
[58] Field of Search .......... 204/149, 152, 275, 278, 204/290 R, 286, 297 R; 210/44, 221

[56] References Cited
UNITED STATES PATENTS

| | | | |
|---|---|---|---|
| 2,389,357 | 11/1945 | Griffith | 204/149 X |
| 3,389,072 | 6/1968 | Strandberg | 204/290 R X |
| 3,479,281 | 11/1969 | Kikindai et al. | 210/44 |
| 3,505,188 | 4/1970 | Pan | 204/149 |
| 3,523,891 | 8/1970 | Mehl | 210/44 |
| 3,543,936 | 12/1970 | Abson et al. | 204/149 X |
| 3,689,315 | 9/1972 | Quentin et al. | 204/290 R X |
| 3,841,250 | 10/1974 | Davies et al. | 204/149 X |

*Primary Examiner*—John H. Mack
*Assistant Examiner*—A. C. Prescott

[57] ABSTRACT

In a tank or a compartment of an electroflotation apparatus for treatment of waste liquid there is provided a substantially horizontal electrode grid structure which is simple to manufacture, install and connect to an exterior source of electricity besides being highly efficient and economical in use. Said grid structure comprises one or more units, each including a plurality of parallel electrode bars which at least at one end are electrically conductively secured to an electrically conductive bus bar and together with said bus bar and terminals attached thereto embedded in a rigid support member made of electrically non-conductive material and extending through an opening in the tank wall. The invention also includes an improved method of manufacturing said grid structure and a fixture with an adjunct device for use in said manufacture.

18 Claims, 11 Drawing Figures

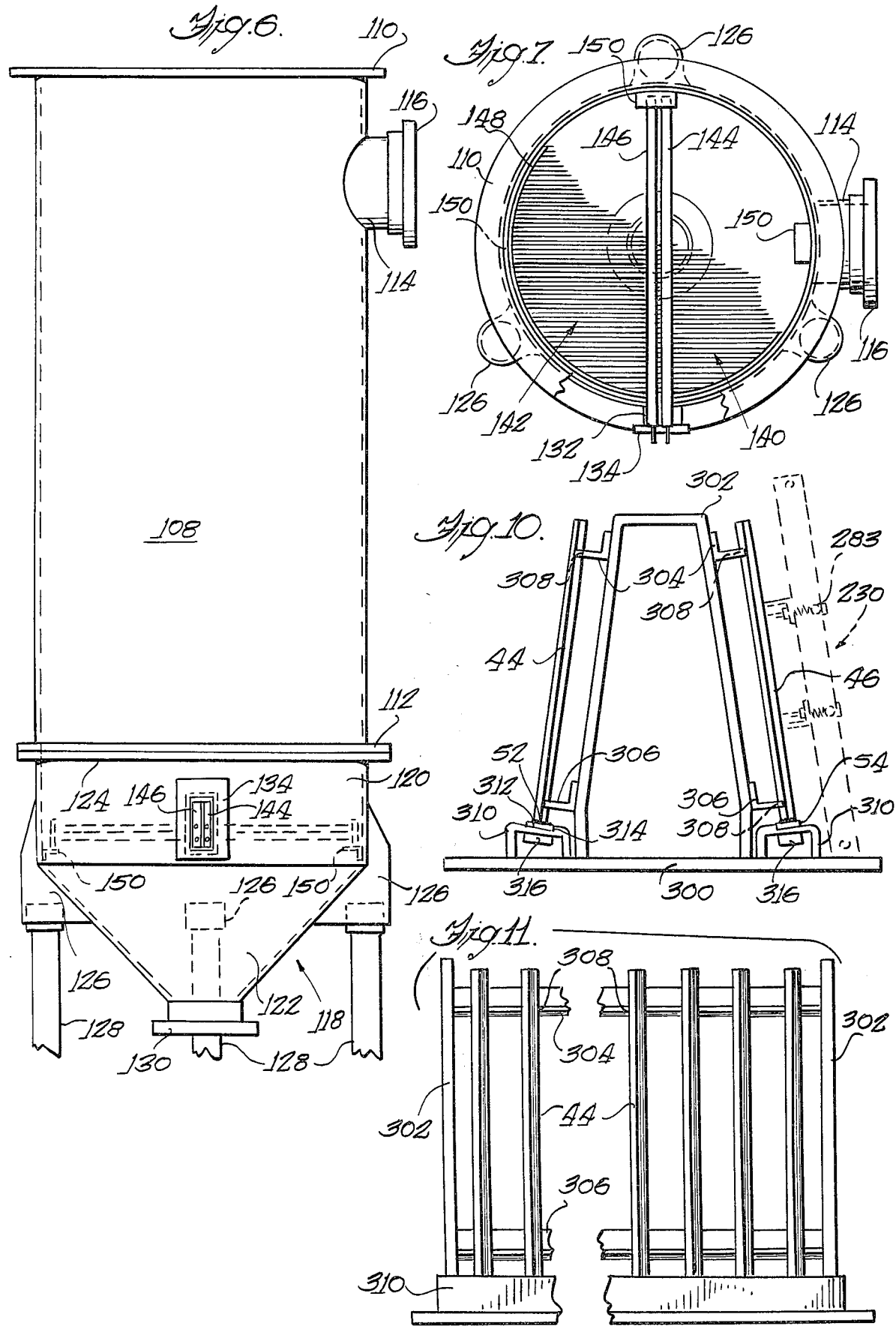

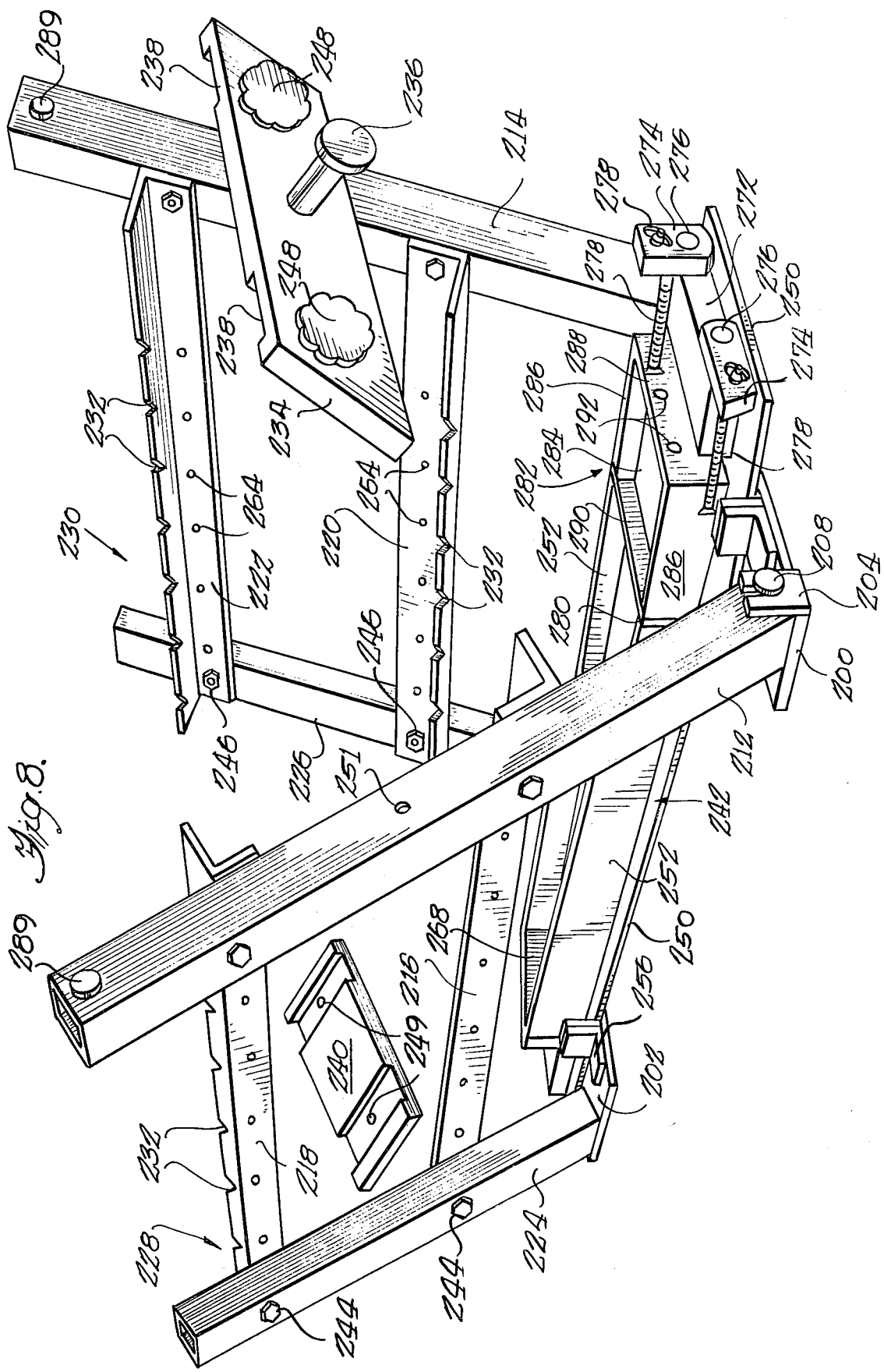

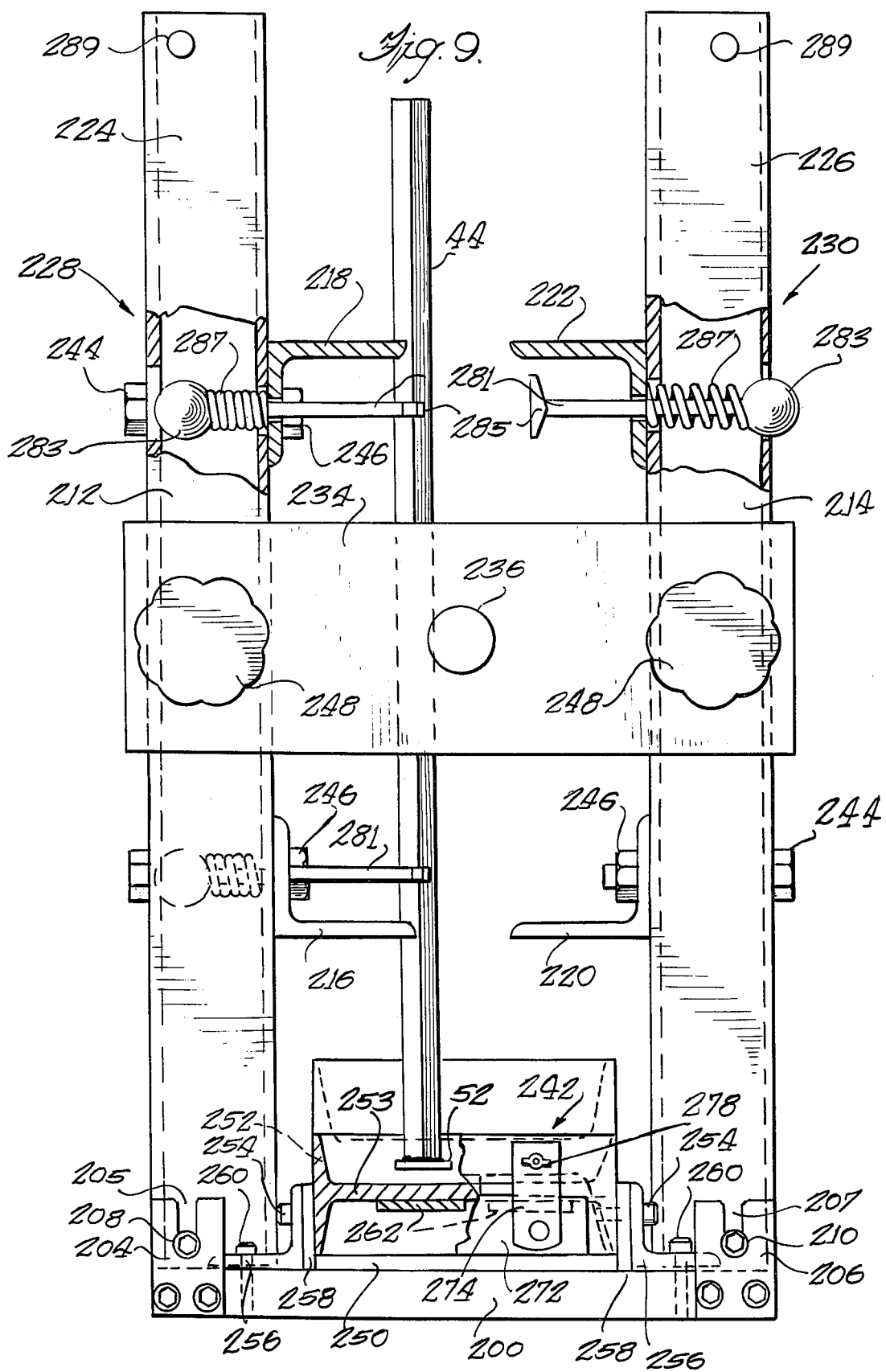

ELECTROFLOTATION APPARATUS

This invention relates to electroflotation apparatus for treatment of liquids, particularly for purification of industrial waste water. More specifically, the invention is concerned with electrode grid structures for apparatus of the kind indicated and with methods and means for manufacturing and installing such grid structures in the apparatus.

Electroflotation apparatus of the kind indicated vary widely in respect of size material and other structual features. Usually they include one or more interconnected tanks or containers of varying shape, such as rectangular or cylindrical, and in some instances such a tank or container is divided into two or more compartments which are in communication with each other in such a manner as to provide for flow of the liquid successively through said compartments from inlet to outlet of the tank while tranversing the electrode grid structures in said compartments in one direction or the other to thus be repeatedly subjected to the influence of the electric fields created by connecting said electrodes to a source of electricity, and to the action of streams or clouds of tiny gas bubbles produced by and rising upwardly from the grid structures. Said rising gas bubbles attach themselves to and entrain particles of substances suspended in the liquid, which particles are thus carried by the bubbles to the surface of the liquid mass in each tank or compartment to form upon said surfaces a foam cover which may be removed by means of a suitable foam removing device, of which a variety are known in the art. Depending upon its contents, said foam is then disposed of in various manners, and the nature of said contents may be selectively controlled by adding suitable chemicals to the liquid at different stages of its passage through the apparatus.

It has been found that the nature and arrangement of the electrode grids in apparatus of the kind indicated is of the utmost importance to the efficiency, versatility and economy of the electroflotation apparatus and process. Accordingly, the principal object of the present invention is to provide an electrode grid structure for the purpose indicated which represents a marked improvement over known grid structures in the respects mentioned above.

Figure 2:
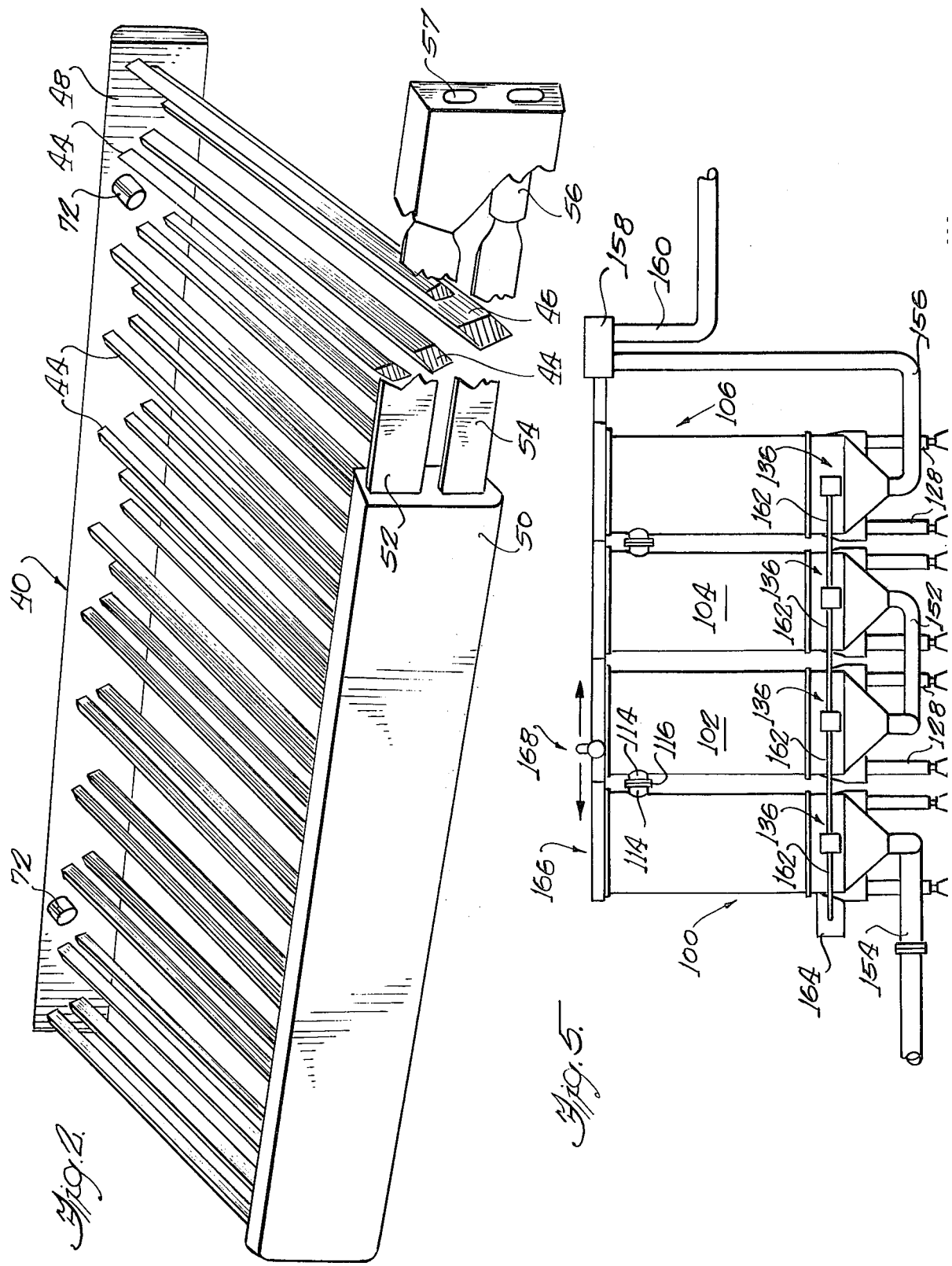
Figure 3:
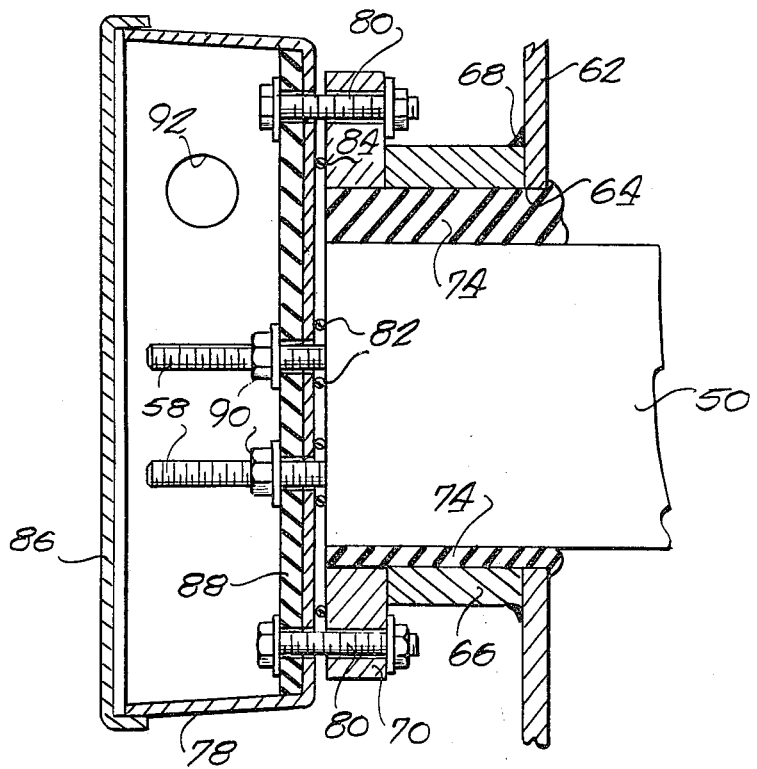
Figure 4:
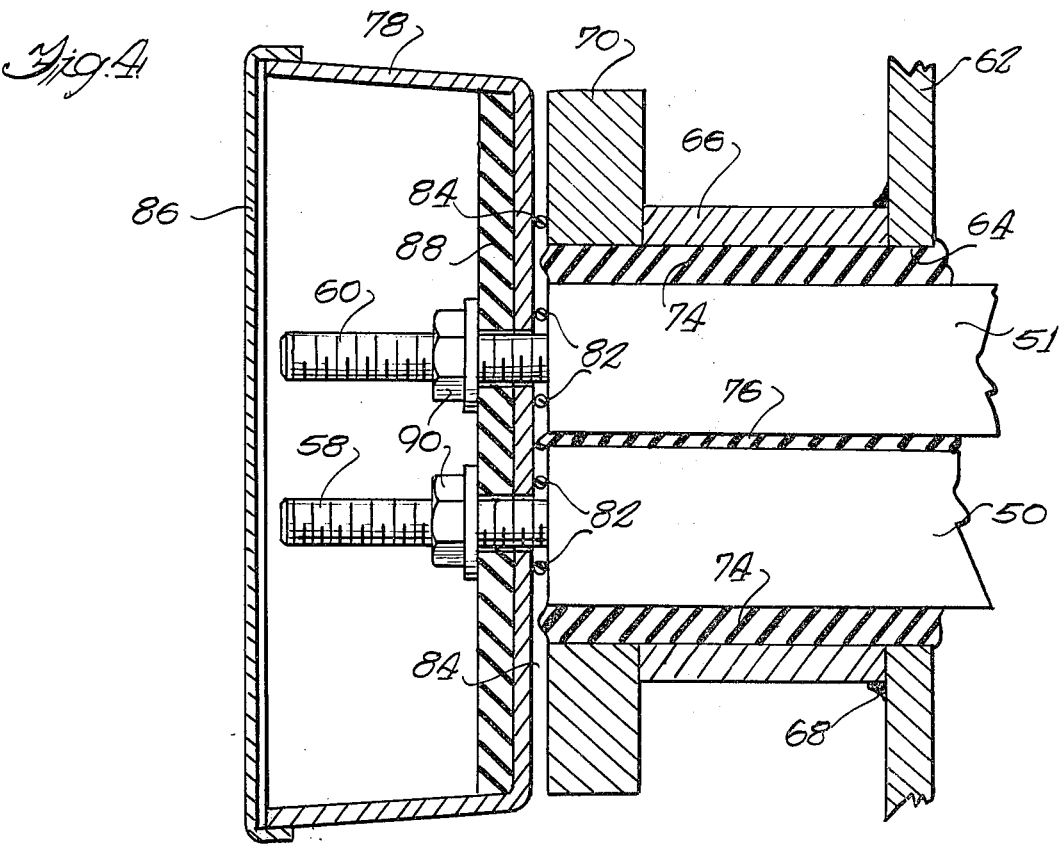

To this end, an object of the invention is to provide an electrode grid structure of the kind indicated which is readily and conveniently manufactured and installed at very reasonable cost. Other objects and advantages of the invention will be apparent from the following description of preferred embodiments thereof, having reference to the accompanying drawings, in which,:

FIG. 1 is a perspective view of a four-compartment electroflotation apparatus, portions being broken away to partially show the electrode grid in one of the compartments, FIG. 2 is a perspective and partially exploded view, on a larger scale, of an electrode grid structure according to the invention, FIGS. 3 and 4 are a vertical and a horizontal cross-sectional view, respectively, of a junction box and its arrangement in connection with the electrode grid of FIG. 1, FIG. 5 shows a side view of a different type of electroflotation apparatus provided with electrode grid structures according to the invention.

FIGS. 6 and 7 are enlarged views, corresponding to FIG. 5 of one of the tanks of the apparatus of said FIG. 5, FIGS. 8 and 9 are a perspective view and an end view and partial section, respectively, of a fixture suitable for use in the manufacture of electrode grids according to the invention, and FIGS. 10 and 11 show an end view and a side view, respectively, of an adjunct of the fixture of FIGS. 8 and 9.

In FIG. 1 an electroflotation apparatus is shown diagrammitically which comprises a rectangular, leg-supported tank 10 divided by vertical partition walls 12, 14 and 16 into four separate compartments or cells 18, 20, 22 and 24, each substantially rectangular in cross-section. The partition wall 12 extends substantially to the top of the tank 10, while the partition walls 14, 16 have the upper edge at a somewhat lower level. A vacuum operated foam remover device, generally indicated at 26, is supported on end rollers (not shown) on the upper edge of two opposite side walls of the tank 10 and movable back and forth by drive means (not shown) across the top of the tank in a direction parallel with the partition wall 12 for discharging of foam by suction through a discharge pipe 28. The foam remover 26 is described in detail in our copending patent application Ser. No. 453.174 filed Mar. 20, 1974, to which reference is made.

Each of the cells 18-24 is provided with a separate bottom which is substantially funnel-shaped, as partially indicated at 30 for the bottom of the cell 22. An influent pipe (not shown) is connected to the bottom of cell 18, and an effluent pipe 32 is similarly connected to the bottom of cell 24 and extends upwardly to a weir box 34, which is secured to the tank 10 and provided with a vertically adjustable weir partition 36 for regulating the liquid level in the tank. A discharge pipe (not shown) is connected to the bottom of the weir box 34 at the side of the partition 36 opposite to the effluent pipe 32. A pipe 38 provides communication between the cells 20 and 22 at the bottom of the same. It is obvious, therefore, that in operation, as described below, liquid may be circulated through the tank from the bottom influent pipe of cell 18, over the top edge of partition wall 14, through the connection pipe 38, over the top edge of partition wall 16, through the effluent pipe 32, to one side of the partition 36 in the weir box 34, over the upper edge of said partition 36 and out through the abovementioned discharge pipe.

Adjacent the bottom of each of the cells 18-24 there is provided a horizontal electrode grid which in the embodiment shown comprises two units 40, 42, the unit 40 being shown on an enlarged scale in FIG. 2. It consists of a plurality of electrode bars 44, 46 which extend in parallel between two supporting side members 48 and 50. In the embodiment shown, all the electrodes 44, 46 are of square cross-section, and the cross-sectional area of each electrode 46 is larger than that of each electrode 44, while the total number of electrodes 44 is greater than that of electrodes 46. These dimensions and numbers, as well as the material of which the electrodes are made, may vary depending upon several circumstances, which will be explained below.

At one end the electrodes are simply embedded in the material of side member 48, while at the opposite end the electrodes 44 are conductively secured to a flexible or rigid bus bar 52 of an electrically high conductive material, preferably copper. The electrodes 46 are similarly secured to a second bus bar 54, and both bus bars 52, 54 are together with the adjacent end portions of the electrodes encapsulated in the material of side member 50. The side members 48, 50 are made of a moldable, electrically non-conductive material which upon curing becomes rigid and is resistant to moisture and chemicals. Certain kinds of plastics and glass having properties which meet the requirements in each case are examples of such materials.

At one end the bus bar 54 has attached thereto a conductive terminal sleeve 56 which is also embedded in the material of the side member 50. The members 54 and 56 may be secured to each other by any suitable means, such as welding, brazing, staking or a conductive adhesive. A similar terminal sleeve 57 is in a similar manner secured to the end of the bus bar 52. Before encapsulation the bus bars and the terminal sleeves may be covered with a thin flexible film of a moisture and chemicals resistant material, and the side members 48, 50 may be coated, after being cured, with a similarly resistant material, e.g., sodium silicate. The connection between the electrodes and the bus bars may be accomplished by means of an electrically highly conductive plastics material or adhesive, by welding or staking, or by a combination of said means. The terminal sleeves are adapted to have terminal bolts 58, 60 (FIGS. 3 and 4) firmly and conductively secured thereto as, for example, by thread engagement.

An outer wall 62 of the tank 10 is provided with an opening 64 in its lower portion and a nozzle 66 extends outwardly from said opening 64 and is made integral with the wall 62 or secured thereto by any suitable means, as at 68. The nozzle 66 is provided at its outer end with a flange 70. The grid units 40, 42 are lowered, preferably separately, into the compartment 22 of the tank 10 in an inclined position in such a manner that the end thereof closest to the tank wall 62 precedes the opposite end, thus permitting the side members 50, 51 to be inserted in the nozzle 66 before the trailing ends of said units 40, 42 are completely lowered onto suitable support members (not shown) secured to the partition wall 16. Alternatively, in case the funnel-shaped bottom 30 of the cell is secured to the inside of the cell wall, the support may consist of the top edge of said bottom.

In this position of the grid units 40, 42 the end portions of the side members 50, 51 extend outwardly to be flush with the outer side of the flange 70, as shown in FIGS. 3 and 4. Such lowering of the grid units may be facilitated by the use of ropes, wieres or special tools (not shown) which are temporarily attached to projections 72 (FIG. 2) on the inner sides of the side members of the grid units and easily removable when the grid units are in position.

A suitable sealing material which is resistant to moisture and chemicals, for example a silicone rubber material, is provided within the nozzle 66 around and between the side members 50, 51, and indicated at 74 and 76, and an electrical junction box 78 is secured to the flange 70 by means of bolt and nut assemblies 80, as shown, with intermediary gaskets 82, 84 surrounding the terminal bolts 58, 60 and the nozzle opening. The junction box 78 and a cover 86 for the same are preferably made of fiber glass, and the bottom of the junction box is covered by an insulating sealing disc 88, for example of silicone rubber, against which nuts 90 on the terminal bolts 58, 60 are tightened. Apertures 92 are provided in the side walls of the junction box 78 for passage of electrical connection cables 94 (FIG. 1) from a main coupling box 96 secured to the outside of the tank 10. The arrangement of the grid structures and junction boxes is, of course, similar for all four cells 18-24.

In operation, the waste liquid flow through the tank is as described above, so that said liquid passes between the electrodes in the grid units alternately upwardly and downwardly. In the embodiment shown the connections of the electrodes to a source of electricity was such as to cause the smaller electrodes 44 to act as anodes and the larger electrodes 46 as cathodes. Thanks to the cross-sectional shape of the electrodes and the arrangement of the anodes and cathodes in relation to each other the flow of the electrical current between the flat sides of adjacent electrodes is very efficient in producing gas bubbles which rise in a steady stream upwardly in each of the cells 18-24 to produce a layer of foam on the top surface of the liquid, said foam layer being continuously removed by the reciprocating foam remover device 26. Chemical treatment of the liquid may be provided by introducing desirable chemicals at any point of the flow process as, for example, through valve-controlled tubing attachments (not shown) to the influent pipe, the connection pipe 38, etc., in a manner well known in the art.

As mentioned above, the composition, size, number and mutual arrangement of the anodes and cathodes may vary according to specific requirements. In one highly efficient embodiment the grid structure consisted of 35 positive electrodes of a silicon iron alloy, each having an exposed length of 14.375 inches and a cross-sectional area of ½ inch × ½ inch, corresponding to a total exposed area of $35 \times 4 \times 0.5 \times 14.375 = 1006.250$ square inches. The negative electrodes were 23 pieces of ¾ inch square graphite rods, resulting in a total exposed area of $23 \times 4 \times 0.75 \times 14.375 = 991.875$ square inches.

Depending upon local space conditions and/or other considerations it is sometimes desirable to arrange the cells or compartments in a manner different from that shown in FIG. 1. For example, it may be advantageous to arrange the cells in a single straight row as indicated in FIG. 5. Although this may be accomplished with a number of cells of square or rectangular cross-section, it is usually is such cases preferable for manufacturing and cost reasons to use cylindrical cells in the form of separate, properly interconnected units or modules such as generally indicated at 100, 102, 104 and 106 in FIG. 5.

A preferred design of such an individual unit or module is shown in greater detail in FIGS. 6 and 7 and comprises a cylindrical body 108 provided with a circumferential flange 110 at the top end thereof and a similar flange 112 at the bottom end. In FIG. 7 portions of said flanges are broken away in order to show details of an electrode grid unit to be described. A pipe nipple 114 with an end flange 116 is provided on the cylindrical body 108 adjacent the top thereof for connection with an adjacent module.

The bottom portion of the module constitutes a separate structural unit 118, preferably molded of fiber glass and consisting of an upper cylindrical portion 120 integral with a funnel-shaped lower portion 122. Said unit 118 is provided with a top flange 124 for connection with the flange 112 on the cylindrical body 108. The unit 118 is also provided with vertical sleeve projections 126 for receipt of (in this example three) module supporting legs 128. The funnel-shaped portion 122 has a bottom flange 130, and the cylindrical portion 120 is provided with a side opening for a nozzle 132 with an end flange 134 secured thereto for attachment of a junction box 136 (FIG. 5) of the same kind and for the same purpose as the junction box 78 in FIGS. 3 and 4.

Within the cylindrical portion 120 of the bottom unit 118 an electrode grid assembly is supported which comprises two grid units 140, 142, similar in construction and function to the grid units 40, 42 of FIG. 1, although somewhat different in shape in conformity with the circular contour of the module. Thus, each grid unit 140, 142 has a side member 144 and 146, respectively, corresponding to the abovementioned side member 50 and 51, respectively, and extending through the nozzle 132 while, on the other hand, the outer end portions of the electrodes are electrically insulated from each other by a radially narrow strip 148 of fiberglass material which may readily be applied by hand prior to insertion of the grid units in the module. The grid units are supported on fiberglass angle members 150 secured to the inside of the cylindrical bottom portion 120.

The modules 100-106 are interconnected in an obvious manner by means of the flanges 116 and a bottom connection pipe 152 for the flow from an influent pipe 154 to an effluent pipe 156, a weir box 158 and a discharge pipe 160, similarly as in FIG. 1. In addition, there are suitable cable connections 162 between the junction boxes 136 and to a main coupling box 164 which may be mounted on any one of the modules 100-106. At the top each module is provided with a section of a foam remover guide channel 166 which extends over the four modules and forms the reciprocation path for a foam remover 168 of any preferred type. It may be remarked here that all the modules may be identical as regards the cylindrical bodies 108, the pipe nipples 114, 116 and the sections of guide channel 166. Also, all the bottom units 118 may be identical, and in assembling the modules not needed pipe nipples 114, 116 may be closed by means of a shutoff disc secured to the flange 116, and the bottom units 118 may be secured to the cylindrical module bodies as shown in the example described above or, for example, reversed by 180° so that every other module will have its junction box 136 on the opposite side, with the cable connections 162 modified accordingly. Accordingly, a module assembly of this kind is highly adaptable to installment in localities of varying shape and size.

The operation is so similar to that of the embodiment of FIG. 1 as not to require repetition. It is obvious also, that the modules in an installation of this kind may be made rectangular or square in cross-section if for any reason such should be found advantageous. Another obvious modification (not shown) would be to manufacture the top portion of the cylindrical body, including the pipe nipple 114, 116, as one molded piece with the respective section of the foam remover guide channel 166 to be assembled with the remainder of the cylindrical body below the pipe nipple 114.

The invention includes a method and means for the manufacture of the electrode grid units described above. A preferred construction of a fixture for use in such connection is shown in a general way in FIG. 8 and in greater detail in FIG. 9. It comprises two rectangular, parallel base plates 200, 202, disposed at some distance from each other as plainly shown in FIG. 8, and each, as shown in connection with base plate 200, provided at both outside corners with upright bearing lugs 204, 206, each having a slot 205 and 207, respectively, therein for pivotally receiving a pivot pin 208 and 210, respectively. Each of said pivot pins is secured to a frame member 212 and 214, respectively, and said frame members are by means of horizontal angle bars 216, 218, 220 and 222 connected with similar frame members 224 and 226 which are pivotally journaled on the base plate 202 in the same manner as the frame members 212, 214 on base plate 200. Accordingly, the members 212, 216, 218 and 224 together constitute a frame 228, while the members 214, 220, 222 and 226 together constitute a second frame 230, and said frames 228, 230 are pivotable toward and away from each other on the aforementioned pivot pins, two of which are shown at 208 and 210. The angle bars 216 - 222 are on their free longitudinal edges provided with a plurality of recesses 232 for a purpose to be explained below.

An end plate 234 is provided with a handle 236 on one side and with two vertical recesses 238 on the opposite side, said recesses being disposed and adapted to receive the frame members 212, 214 therein when said frame members are in vertical position. Bolts with large hand-grip heads 248 may be inserted through holes 289 in the end plates for threaded engagement with interiorly threaded holes 251 in the frame members 212, 212, 224 and 226 in order to removably secure the end plates to said frame members. A similar end plate 240 is provided for identical co-action with the frame members 224 and 226. An elongate mold structure 242 is supported on the base plastes 200, 202 in a fixed position, as will be further described below.

The angle bars 216-220 are secured to the frame members 212, 214, 226 by means of bolt and nut assemblies 244, 246, as shown also in FIG. 9 where certain parts have been omitted in connection with the angle bar 220 for clarity of illustration. The mold structure 242 comprises a bottom plate 250 which extends at least the length of the frames 228, 230 and has secured to the top surface thereof an I-beam 252 disposed on its side so that its web 253 extends in a horizontal direction. The I-beam 252 with the bottom plate 250 is secured to the base plates 200, 202 by bolts 254 each of which extends through the vertical flange of an angle iron 256 at each side and the adjacent lower flange of the I-beam 252, with an intermediary heat insulating washer 258. The horizontal flange of each of said angle irons 256 is secured to the base plates 200, 202 by means of bolts 260. This arrangement is identical at both ends of the mold structure.

In the space enclosed by the bottom plate 250 and the web 253 and lower flanges of the I-beam 252 there are provided two heating elements 262 which extend the length of the I-beam 252 and are maintained by any suitable means (not shown) in close heat conductive contact with the underside of the web 253 of the I-beam 252. The channel-shaped spaces between the web 253 and the flanges of the I-beam 252 are closed at one end by an end cover 268 secured to the I-beam by any suitable means. It is to be understood, however, that said end closure may be replaced by an arrangement such as will not be described with reference to the opposite end portion of the mold structure 242.

The bottom plate 250 extends outwardly beyond the base plate 200 and has secured (as by welding) to the top side thereof a block 272. Two levers 274 are pivotally secured to the outer side of said block 272 by means of pivot pins 276 which extend horizontally outwards from said block. In FIG. 8 one of said levers 274 is shown in an upright position, while the other lever is shown turned down so as to rest with its free end on the bottom plate 250. A wing bolt 278 is threadedly engaged with a threaded horizontal bore through the free end portion of each of the levers 274 and extends inwardly therefrom as shown.

The upper flanges of the I-beam 252 and an upper portion of the thickness of the web 253 are cut away at 280, and a spacer insert 282 is adapted to rest upon the remainder of the I-beam web. Said spacer insert 282 is in the form of a box having a bottom 284 and three side walls 286, 288. The two opposite side walls 286 form extensions of the upper flanges of the I-beam 252, and the third side wall 288 is in position to be engaged by the ends of the wing bolts 278. A removable partition plate 290 is insertible between the spacer insert 282 and the ends of the upper I-beam flanges as shown. The insert side wall 288 is provided with two holes 292 for a purpose to be explained.

The angle bars 216-222 are provided with a plurality of uniformly spaced holes 264 through the upright flanges thereof, and in each of said holes an electrode clamping member 281 (omitted in the lower righthand portion of FIG. 9) is disposed which comprises a rod 281 having a plastic knob 283 at one end and a clamping shoe 285 at the other end. Each of said clamping members 281 is disposed at the midpoint of the distance between two of the recesses 232 in the horizontal flanges of the angle bars 216-222 and surrounded by a compression spring 287 in engagement with the knob 283 and the upright angle bar flange. Each of the frame members 212, 214, 224, 226 is provided adjacent the top end thereof, as viewed in FIGS. 8 and 9, with a pivot pin 289 corresponding to the pivot pins 208, 210 at the bottom end thereof. The depth of the recesses 232 as well as the distances between the same and between the holes 264 may be varied to suit different arrangements of the electrode bars in the grid structure, and the size and shape of the clamping shoes 285 should be adapted accordingly.

A useful adjunct to the mold structure 242 is shown in FIGS. 10 and 11. It comprises a base 300, on which two (or more) identical support members 302 are mounted side by side, each of said support members being of, generally speaking, inverted U-shape. Horizontal angle bars 304, 306 are secured, one above the other, to the outside of the inclined legs of said support members, and said angle bars are provided in the free edges of their approximately horizontal flanges with vertically aligned recesses 308 which are spaced apart the same distance as the previously mentioned recesses 232 in the angle bars 216-222 in FIG. 8.

Two inverted channel bars 310 are also mounted on the base 300 adjacent to the outside of said support members 302 and in parallel with the angle bars 304, 306. The top side of each of said inverted channel bars is preferably inclined transversely, as at 312, toward a longitudinal abutment surface 314, said inclination being substantially at right angle to the adjacent legs of the support members 302. A heating element 316 of any suitable kind is secured to the underside of the web of the channel bar 310 and in close heat conductive contact therewith.

In manufacturing an electrode grid, such as grid 40 in FIG. 1, one of the bus bars 52, 54 with the terminal sleeve 56 secured thereto is placed on the inclined surface 312 of one of the channel bars 310 with a longitudinal edge in engagement with the abutment surface 314. Each one of a set of electrodes, for example the electrodes 44, is then coated on one end surface with a layer of electrically highly conductive welding or adhesive material and placed in an aligned pair of recesses 308 in the angle bars 304, 306 with the coated end resting on the respective bus bar, as indicated in FIG. 10, whereupon the heating element 316 is energized so as to fuse the electrodes to the bus bar. The other set of electrodes 46 are similarly fused to the bus bar 54 at the opposite side of the support members 302 (FIG. 10). Depending upon the ambient temperature, moisture and draft conditions, it is often advisable to provide a removable or openable hood (not shown) enclosing the entire structure to provide controllable conditions for the fusing and curing of the coating layers.

Upon completion of the curing, the hood (if any) is removed and the frames 228, 230 are placed against the electrode sets 44 and 46, respectively, as indicated in dotted lines at the righthand side of FIG. 10, with the electrodes engaging the recesses 308 and the frame members 212, 214, 234 and 236 having their bottom ends in engagement with the base 300.

By successively pushing inwardly on the knobs 283 against the action of the springs 287 and with the shoes 285 in a vertical position as shown in the upper righthand portion of FIG. 9 said shoes are pressed inwardly past the electrodes. Each knob is then rotated through 90° in either direction and the manual force thereon is released, thus allowing the spring 287 to move the shoe back sufficiently to engage the adjacent surfaces of two neighboring electrodes and to hold them firmly clamped against the respective angle bars in the recesses 232.

In the meantime the mold structure 242 has been prepared for receipt of the frames 228, 230 by loosening the wing bolts 278, turning the levers 274 to the position occupied by the lefthand lever 274 in FIG. 8 and removing the partition plate 290. With the wing bolts 278 left untightened, the frames 228, 230, together with the electrodes (and bus bars) clamped thereto are transferred to the mold structure 242 by inserting the pivot pins in their respective slots in the bearing lugs and pivoting the frames to the vertical position shown in FIG. 9, whereupon the end plates 234 and 240 asre secured in the obvious manner to retain the frames in said position. It should be noted here that the distance between the inclined surface 312 and the base 300 in FIG. 10 is such that, when the frames 228, 230 are mounted in the mold structure 242 as just described, the bus bars 52, 54 are disposed at some distance above the upper surface of the web 253 of the I-beam 252, as indicated in FIG. 9.

With the levers 274 pivoted away from each other to provide a free manipulating space, the terminal sleeves, 56, 57 are lifted into alignment with the holes 292 and a pair of bolts (not shown) are inserted through said holes 292 and screwed into the interiorly threaded end portions of the terminal sleeves, thereby tightening said sleeves against the inside of the end wall 288 to provide a tight seal. Sealing washers (not shown) may be used in this connction, if required. The levers 274 are then turned to vertical position and the bolts 278 are tightened against the wall 288 to clamp the spacer insert 282 firmly against the end surfaces of the upper flanges of the I-beam 252. The electrically non-conductive material of which the side bars 50 are made, is poured into the mold and left to cure. The heating elements 262 are energized to the extent required during this procedure.

For producing the side member 48 of the electrode grid the assembly comprising the frames 228, 230, the electrodes and the cured side members 50 is removed as a unit from the bearing lugs and inverted (the pivot pins 289 inserted in the bearing lug slots), while the spacer insert 282 is released from the terminal sleeves 56 and the wing bolts 278 are unscrewed sufficiently to permit movement of the insert 282 enough for insertion of the partition plate 290, as shown. The wing bolts 278 are again tightened, and the pouring of the side member 48 is effected in the channel space to the left of partition plate 290 in FIG. 8. By releasing the clamping members 281 and removing the end plates 234, 240 the frames 228, 230 may then be pivoted away from each other, or removed, and the completed electrode grid 40 may be lifted out from the mold structure. The grid 42 is, of course, produced in the same way.

For producing an electrode grid such as 140 and 142 in FIG. 7, the same procedure is followed, except that the pouring of side members corresponding to the side members 48 is omitted. In this case, the frames 228, 230 and the adjunct device are modified by varying the relative height location of the angle bars 216-222 and 304, 306 to provide proper support for the electrode rods which are of unequal length. This is, of course, a simple matter of adaptation.

Numerous modifications of the details and combinations described above and shown in the drawings are feasible within the framework of the invention which is not to be considered limited in scoppe except as defined in the attched claims.

What we claim is:

1. Electroflotation apparatus for purification of liquids, such as industrial waste water, comprising
   a. a tank, or container, having a top end, a bottom end and side walls extending between said top and bottom ends, the top end of said tank being open,
   b. influent means adjacent one end of said tank,
   c. effluent means adjacent the other end of said tank,
   d. control means for controlling the maximum liquid level in the tank,
   e. two sets of elongate, substantially horizontal and parallel electrodes in said tank arranged to cover the entire cross-sectional area of the tank, with free passages for the liquid between the electrodes,
   f. an electrically highly conductive bus bar interconnecting the electrodes in each of said sets of electrodes separately at one end of said electrodes,
   g. an electrically highly conductive terminal member secured to each of said bus bars at adjacent ends thereof,
   h. an electrically insulating elongate support member encapsulating said bus bars, adjacent end portions of the electrodes and the terminal members except the free end surfaces of the latter, and together with said electrodes forming a grid structure, said support member extending through a nozzle in the side wall of said tank to the outside thereof,
   i. a junction box on the outside of said tank enclosing said nozzle and means connecting said terminal members to opposite poles of a source of electricity, and
   j. foam removing means at the top end of said tank, whereby the liquid passing through said tank from said influent means to said effluent means is subjected to the action of electric current passing between said two sets of electrodes to cause a stream or cloud of gas bubbles to form and pass upwardly through the liquid to the free surface thereof while entraining suspended ingredients to form a mass of foam on the surface of the liquid to be removed therefrom by said foam removing means.

2. An electroflotation apparatus according to claim 1, in which said grid structure comprises two identical units each covering half the cross-sectional area of said tank, said units having their electrically insulating elongate support members disposed in parallel in side engagement with each other and both extending together through said nozzle into said junction box.

3. An electroflotation apparatus according to claim 1, in which the free end portions of said electrodes are encapsulated in a second electrically insulating elongate support member.

4. An electroflotation apparatus according to claim 1, in which the encapsulating material in said support member consists of electrically non-conductive thermosetting plastics material.

5. An electroflotation apparatus according to claim 2, in which said tank is cylindrical in cross-section with said electrodes of correspondingly varying length and with the free end portions of the electrodes in each of said grid structure units maintained in position by means of a radially narrow strip of an electrically insulating material, such as fiberglass, extending around and between said end portions of the electrodes.

6. An electroflotation apparatus according to claim 1, in which the bottom end portion of said tank below said electrode grid structure is substantially funnel-shaped with said influent or effluent means, respectively, connected to the bottom end of said funnel.

7. An electroflotation apparatus according to claim 1, in which said tank consists of a compartment, or cell, of a larger container divided into a plurality of such compartments in side by side arrangement, one of said compartments being provided with said influent means adjacent the top or bottom end thereof and having said effluent means at the opposite end and in communication with the corresponding end of an adjacent one of said compartments so as to constitute the influent means for said adjacent compartment, and so on, thereby providing for continuous flow of the liquid through all said compartments and through the effluent means of the last of said plurality of compartments, said foam removing means being adapted to function in common for all of said compartments.

8. An electroflotation apparatus according to claim 7, including valve controlled feeding means connected with said influent means for supplying of chemicals and other treatment media selectively to said compartments.

9. In an electroflotation apparatus for purification of liquids, such as industrial waste water, a. a plurality of separate tanks which are open at the top and disposed adjacent to each other, b. influent means adjacent one end of a first one of said tanks, c. conduit means adjacent the opposite end of said first tank and providing communication with the adjacent end of a second tank, d. additional conduit means alternatingly at the top and bottom ends of said second tank and subsequent tanks to provide for flow through said plurality of tanks alternately upwardly and downwardly, the last one of said tanks being provided with effluent means disposed so as to correspond with said alternating flow pattern through the tanks.

e. a grid structure including two super-imposed sets of elongate, substantially parallel and horizontal electrodes in each of said tanks and extending across the entire cross-section thereof while leaving passage openings for the liquid between said electrodes.

f. an electrically conductive bus bar conductively secured to adjacent ends of each of said sets of electrodes, g. an electrically conductive terminal member connected to each of said bus bars at one end thereof, h. a junction box secured to the outside of said tank, i. an elongate side member of electrically insulating material encapsulating said bus bars, said terminal members and adjoining portions of said electrodes, said side member extending through the tank wall into said junction box, j. electrical conduits connected to said terminal members in said junction box and to opposite poles of a source of electricity, and k. means extending across the top ends of said tanks and adapted to support foam remover means, whereby liquid passing in succession alternatingly upwardly and downwardly through said tanks is subjected to the electric current passing from one of said sets of electrodes to the other and causing formation of gas bubbles which rise to the liquid surface while entraining suspended particles to form a mass of foam on said surface of the liquid, said foam being removed by said foam remover.

10. The electroflotation apparatus according to claim 9, in which said electrical conduits include portions extending from the junction box on one of said tanks, to the junction box on another in series connection.

11. A method of producing a grid structure for an electroflotation apparatus tank, which grid structure comprises two sets of substantially parallel, elongate electrodes interconnected at one end by an encapsulating rigid member of electrically insulating material which also encapsulates tow bus bars separately conductively secured to said two sets of electrodes, said method comprising the steps of a. electrically conductively securing one of said terminal members to one end of one of said bus bars, b. electrically conductive securing one end of each of the electrodes of one of said sets of electrodes to one of said bus bars with said electrodes uniformly spaced and in parallel with each other, c. securing the other terminal member and the electrodes of the other set of electrodes in equal manner to the other bus bar, d. releasably attaching a separate holding frame to each of the assemblies of terminal members, electrodes and bus bars thus formed, e. releasably attaching said holding frames to each other and to a channel-shaped molding structure with said bus bars and terminal members in parallel with each other at a distance above the bottom of said channel-shaped mold structure.

f. pouring an electrically non-conductive thermosetting plastics material into said mold structure in sufficient quantity to entirely encapsulate said bus bars and their junctions with said electrodes, and also said terminal members except their free end surfaces and allowing said plastics material to set so as to form a rigid bar member, g. releasing and removing said holding frames, and h. installing said assemblies with the attached rigid bar member in a substantially horizontal position in said tank and with the terminal-containing end portion of said rigid bar member extending through an opening in the tank wall and the free ends of the electrodes electrically insulated from each other.

12. A method according to claim 11, in which prior to said release and removal of the holding frames, said holding frames and assemblies are turned upside down to place the free end portions of said electrodes within said channel-shaped mold, the length of which is shortened by an amount substantially corresponding to the length of said terminal members by inserting a transverse partition wall in said mold, whereupon a quantity of said electrically non-conductive plastics material is poured into the mold and allowed to set to encapsulate the end portions of said electrodes.

13. A method according to claim 11, including the step of applying an electrically insulating strip of material around and between the free end portions of said electrodes.

14. A method according to claim 11, including the step of installing a second of said grid structures in the tank with said rigid bar members parallel beside and in engagement with each other and having their end portions extending through said opening in the tank wall.

15. A fixture for use in the manufacture of a grid structure for an electroflotation apparatus tank, said grid structure comprising two sets of substantially parallel, elongate electrodes interconnected at one end by an encapsulating rigid member of electrically insulating material which also encapsulates two bus bars separately conductively secured to said two sets of electrodes, said fixture comprising a. an elongate substantially channel-shaped mold member, b. closure means for both ends of said mold member, c. the closure means for at least one end of said mold member including a removable spacer insert having a bottom, an end wall and two side walls with said side walls forming extensions of the side walls of said channel-shaped mold, d. clamping means connected to said mold member and disposed longitudinally outwardly of said spacer insert, e. a support member included in said clamping means and being fixedly secured to said mold member, f. two support arms pivotally secured to the end surface of said support member to rotate on axes parallel with said mold member, g. a clamping bolt extending through each of said support arms in parallel with said pivot axes and in threaded engagement with the respective suppot arm, said clamping bolts being adapted to be screwed into abutment with said spacer insert end wall when said support arms are in their upright position, and to be screwed out of such abutment and moved away from each other laterally when said support arms are pivoted away from each other, whereby said spacer insert may be selectively fixedly maintained in operative position as an extension of the mold member and released by means of said clamping bolts, h. a removable partition wall insertible between said spacer insert and the adjacent end surfaces of the mold member side walls, whereby when said partition wall is removed and the spacer insert clamped in operative position, the combined length of said channel-shaped mold member and spacer insert is sufficient to accommodate said but bars with attached terminal connection members, while when said partition wall is inserted and the spacer insert clamped in position, the length of the channel-shaped mold member alone is adequate to accommodate said bus bars without attached terminal connection members, i. two holding frames, each adapted for holding one of said sets of electrodes with attached bus bar in substantially parallel spaced relation to each other, j. means pivotally and removably securing said holding frames to said mold member with the pivot axes parallel with the longitudinal axis of the mold member, and k. means for releasably securing said holding frames to each other in parallel substantially vertical position with said bus bars spaced above the bottom of the mold member.

16. A fixture according to claim 15, in which each of said holding frames comprises two elongate, substantially parallel support members, each provided with said pivot means adjacent both ends thereof, said support members being interconnected by at least two angle bars extending transversely thereof and each being provided with a plurality of aligned recesses in the free edge of a projecting flange thereof for receipt of said electrodes, a plurality of clamping means being movably mounted in the other flange each said angle bar and adapted to releasably retain said electrodes in said recesses in parallel relation with each other.

17. A fixture according to claim 16, in which said releasable clamping means comprises a rod slidably disposed in a transverse hole in said other flange of the angular bar and provided with a gripping knob at one end and with a clamping shoe at the other end, a compression coil spring surrounding said rod and having one end in engagement with said knob and the other end in engagement with said other flange, said clamping shoe extending transversely outwardly from said rod sufficiently to engage two adjacent electrodes on the sides thereof facing away from said other flange of the angle bar, when said clamping shoe is forced by manual pressure on said knob and against the spring action through the space between said two electrodes and turned through 90° in either direction followed by release of said manual pressure from said knob.

18. A fixture according to claim 15, including an adjunct device which comprises an elongate bottom support member with a transversely inclined top surface for receiving thereon a bus bar with a row of electrodes resting with their bottom ends thereon and supported in an inclined position substantially perpendicular to said inclined surface by at least one elongate, substantially horizontal bar member provided with spaced recesses for receipt of said electrodes, a heating element being provided in said bottom support member for fusing said electrodes to said bus bar, and means being provided whereby said holding frame may be supported in inclined position with the electrodes received in the recesses of said angle bars and with said clamping means applied, so that said holding frame together with said electrodes and bus bar may be removed from said adjunct device as a unit and transferred to said mold structure.

* * * * *